US009215328B2

(12) United States Patent
Beaucoup et al.

(10) Patent No.: US 9,215,328 B2
(45) Date of Patent: Dec. 15, 2015

(54) BEAMFORMING APPARATUS AND METHOD BASED ON LONG-TERM PROPERTIES OF SOURCES OF UNDESIRED NOISE AFFECTING VOICE QUALITY

(75) Inventors: Franck Beaucoup, Vancouver (CA); Wilfrid LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 1038 days.

(21) Appl. No.: 13/250,751

(22) Filed: Sep. 30, 2011

(65) Prior Publication Data

US 2013/0039503 A1  Feb. 14, 2013

Related U.S. Application Data

(60) Provisional application No. 61/522,517, filed on Aug. 11, 2011.

(51) Int. Cl.
*H04B 3/20* (2006.01)
*H04M 9/08* (2006.01)
*H04R 3/00* (2006.01)

(52) U.S. Cl.
CPC ............. *H04M 9/082* (2013.01); *H04R 3/005* (2013.01)

(58) Field of Classification Search
CPC ... H04L 1/0002; H04L 1/0003; H04L 1/0025; H04L 1/0026; H04L 1/06; H04L 1/08; H04L 1/1829; H04L 1/20; H04L 2001/0093; H04L 25/022; H04L 25/03159; H04L 27/00; H04L 27/2607; H04L 27/2613; H04L 27/2646

USPC .......... 381/66, 91–93, 56–59, 86, 94.1–94.7, 381/71.1–71.6, 71.11–71.14; 379/406.01–406.09; 704/233

See application file for complete search history.

(56) References Cited

U.S. PATENT DOCUMENTS

| 7,831,036 | B2 * | 11/2010 | Beaucoup et al. ....... 379/406.08 |
| 8,184,801 | B1 * | 5/2012 | Hamalainen ............ 379/406.03 |
| 8,374,358 | B2 * | 2/2013 | Buck et al. ................... 381/94.1 |
| 8,515,097 | B2 * | 8/2013 | Nemer et al. ................ 381/94.1 |
| 2008/0008334 | A1 * | 1/2008 | Saito et al. .................... 381/94.7 |
| 2011/0038229 | A1 * | 2/2011 | Beaucoup .................... 367/119 |
| 2012/0148059 | A1 * | 6/2012 | Ohlmeier ........................ 381/66 |

\* cited by examiner

*Primary Examiner* — Lun-See Lao
(74) *Attorney, Agent, or Firm* — Sterne, Kessler, Goldstein & Fox P.L.L.C.

(57) ABSTRACT

A beamforming technique for a microphone array is described to attenuate a source of undesired noise that is deemed the most limiting to audio quality in an acoustic environment. Possible sources of undesired noise include echo, background noise (stationary) and other interference signals (non-stationary). The beamforming technique is updated based on long-term evaluations. Once an evaluation occurs and a decision is made, the beamformer adapts with a maximum responsiveness and without intentional delay, and therefore not affecting the beamformer's tracking ability. When fixed beamforming is utilized, one of several fixed beamformers having different attenuation targets are selected to implement noise attenuation. When adaptive beamforming is utilized, the beamformer adapts whenever the selected target is deemed dominant.

23 Claims, 6 Drawing Sheets

BEAMFORMING APPARATUS AND METHOD BASED ON LONG-TERM PROPERTIES OF SOURCES OF UNDESIRED NOISE AFFECTING VOICE QUALITY

CROSS-REFERENCED TO RELATED APPLICATIONS

This patent application claims the benefit of U.S. Provisional Patent Application No. 61/522,517, filed Aug. 11, 2011, entitled, "Beam-Forming Method Based on Long-Term Properties of Sources of Undesired Noise Affecting Voice Quality," which is incorporated herein by reference in its entirety.

FIELD OF THE INVENTION

The invention relates generally to the field of digital signal processing for acoustic applications, and more particularly to improved microphone beamforming strategies based on long-term properties of sources of undesired noise to improve voice quality in an acoustic environment.

BACKGROUND OF THE INVENTION

The desire for hands-free communications (e.g. cell phones, smart phones, etc.) has led to the increased use of microphone arrays in communications devices. A microphone array that is configured with known "beamforming" techniques can create an acoustic null directed toward undesired noise and therefore attenuate the noise relative to desired sound or speech being captured by the microphone array. Such beamformers can be fixed or adaptive as discussed below.

There are generally three main sources of undesired noise that affect voice quality: echo from speakers that are associated with the communications device, local noise (background noise), and interference (stationary or non-stationary voice such as competing speech). Typically, the choice regarding what source of undesired noise to attenuate is pre-selected by a user or manufacturer. In doing so, various factors are considered including: acoustics of the device, microphone acoustics, and known information about the most disruptive source of undesired noise. For example, if fixed beamformers are being utilized and the user makes the pre-determined decision that echo should be attenuated, then the appropriate beamformer geared towards echo attenuation is activated, and the other fixed beamformers are deactivated.

With adaptive beamforming, the noise targeted for attenuation is also pre-selected so that adaptive beamforming becomes active when the targeted noise is dominant over the other noise sources. Compared to fixed beamformers, an adaptive beamformer can directionally steer the null in the reception pattern of the microphone array in real time to follow any movement of the targeted noise source. For example, assuming interference is pre-selected, and if a competing speaker's voice is present, then attenuation would be applied whenever the competing speaker's voice (interference) is dominant as compared to echo and noise. The interference would continue to be attenuated using adaptive beamforming even as the competing speaker changes positions relative to the microphone array. However, since the decision of which noise to target is typically pre-selected, the user may not be aware of the noise source that will be most disturbing to sound quality at the time the decision is made.

Another approach is to attenuate the dominant source of undesired noise at any given time without any pre-selection. The dominant noise source is detected and a null is steered towards the recognized dominant source in a continuous real-time manner, regardless of noise type. Echo is often the noise that is dominant the majority of the time, except during periods of intermittent noise and/or interference activity that overshadows the echo. The drawback with this approach is that the adaptive beamformer is constantly "chasing" or "adapting to" a different target, which negatively effects the convergence time of the beamformer and the overall echo cancellation because echo is very dynamic in terms of direction and amplitude. One method to mitigate chasing is to slow down the adaptation of the beamformer. However, if the adaptation is slowed down too much, then the "noise tracking" ability for moving interference sources is negatively impacted. For example, if local noise becomes dominant over echo and the source moves relative to the microphone array, then slowing the adaptation may impede the ability of the beamformer to adequately track the moving local noise Ideally, what is needed but not conventionally available, is for the beamformer adaption to occur quickly and efficiently with regards to attenuating the noise source that has the highest impact on degrading the overall sound quality, but does not get distracted or affected easily by other momentary factors.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
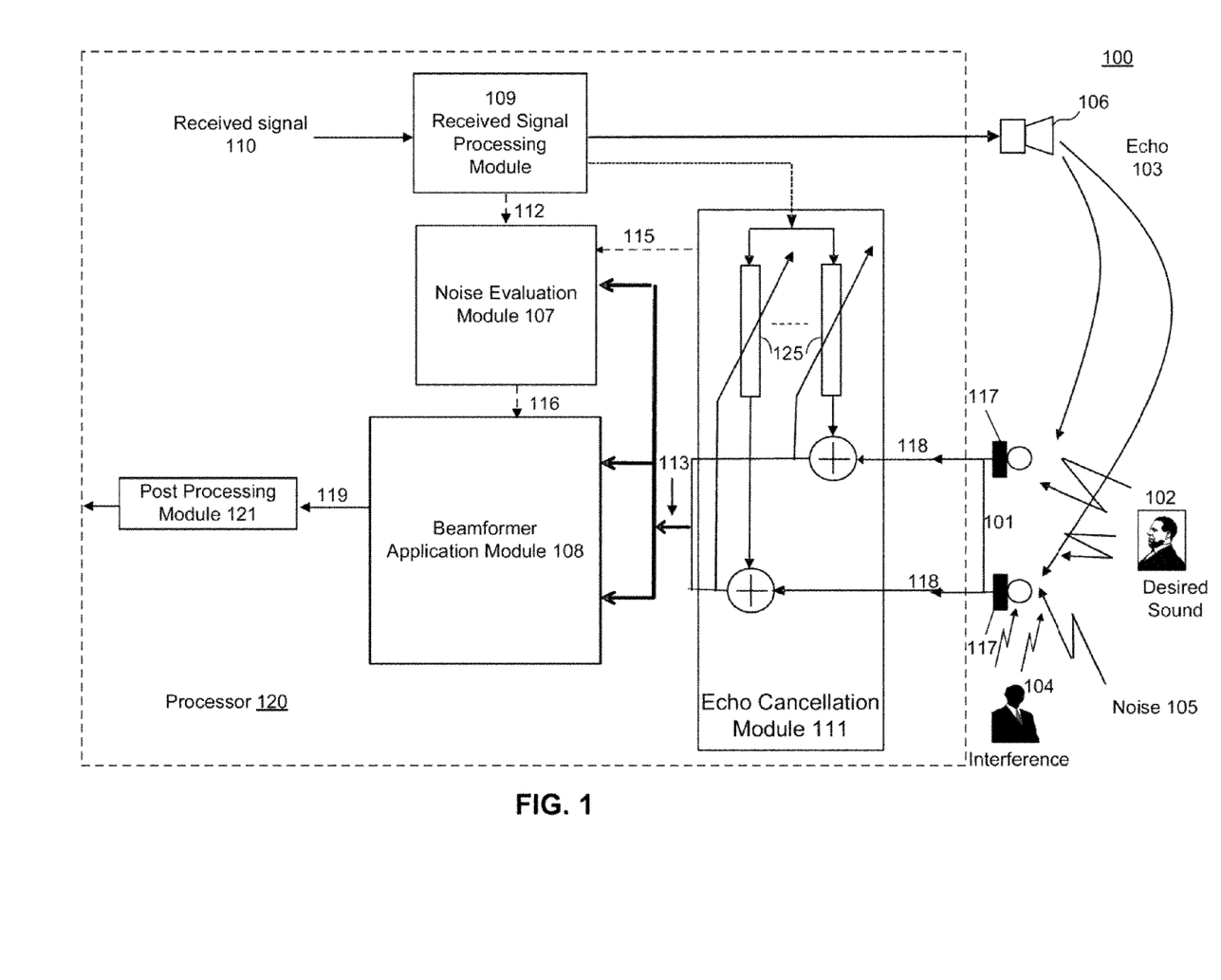
FIG. 1 illustrates an exemplary block diagram of a noise reduction device according to an embodiment of the present invention.

FIG. 1 illustrates an exemplary block diagram of a Noise Reduction Device 100 according to an embodiment of the present invention. A microphone array 101 captures analog signals from a source of desired sound 102 and a plurality of sources of undesired noise including echo 103, interference 104, and noise 105. The microphones in the microphone array 101 may be a plurality of omnidirectional microphones. The echo 103 is the feedback from a speaker 106 that is associated with the microphone array 101. The device 100 may be present in VoIP tablets, IP phones, WiFi phones, Cell phones (hands-free), set top boxes (with VoIP), Skype TV accessories, gaming platforms with interactive audio capability (VoIP), or other similar devices.

The Noise Reduction Device 100 further contains a Received Signal Processing Module 109 to process a received signal 110 that is meant for broadcast by speaker 106, which inadvertently generates the echo 103. Accordingly, the received signal 110 may be a digital signal representing the voice of another speaker on a phone call that is to be broadcast by speaker 106 of the device 100.

Codecs 117 coupled to the output of each microphone in the microphone array 101, convert the received analog signals into digital signals 118. The digital signals 118 are provided to an Echo Cancellation Module 111 to cancel echo 103 caused by the received signal 110, since received signal 110 is known. More specifically, received signal processing module 109 generates a digital version of received signal 110 that is sent to Echo Cancellation Module 111, where it is filtered using filters 125 to account for room acoustics. In an embodiment, the Echo Cancellation Module 111 may be configured to cancel echo in multiple channels. Echo cancellation module 111 then cancels the filtered version of the received signal 110 from the digital signals 118 and outputs echo-cancelled signals 113. The echo-cancelled signals 113 having the desired sound and undesired noise are provided to a Noise Evaluation Module 107 and to a Beamformer Application Module 108 within a processor 120 or a similar environment. It is noted that the undesired noise can include residual echo that still exits after echo cancellation due to imperfect echo cancellation, and therefore will be considered by the Noise Evaluation Module 107 as a possible target source. Processor 120 may be a digital signal processor ("DSP"), for example, operating various hardware and or software signal processing modules as described herein.

The Noise Evaluation Module 107 picks which undesired noise source to attenuate, and generates attenuation information 116 to identify the target noise source. This attenuation information 116 is then provided to the Beamformer Application Module 108 to implement the attenuation decision made in the Noise Evaluation Module 107. More specifically, the Beamformer Application Module 108 attenuates the data representative of the targeted noise identified by attenuation information 616, to generate attenuated signals 119. The attenuation can be implemented with any multi-microphone technique that is capable of attenuating data representative of sound received from a predefined direction relative to the microphone array, including but not limited to steering a null in the target direction.

Still referring to FIG. 1, a Post Processing Module 121 is included as well. After attenuation occurs in the Beamformer Application Module 108, the attenuated signals 119 are forwarded to the Post Processing Module 121 for any post processing that may be done, as will be understood by one of ordinary skill in the art.

Figure 2:
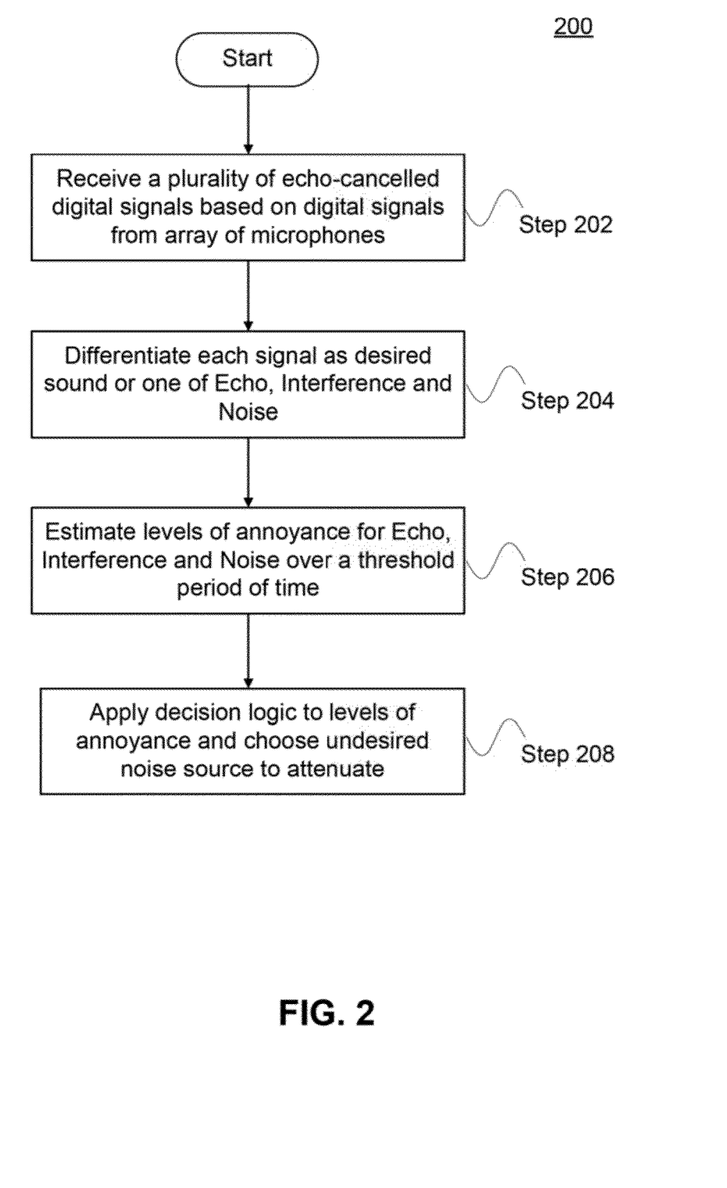
FIG. 2 is a flowchart illustrating the processes conducted within a Noise Evaluation Module according to an exemplary embodiment of the present invention.

FIG. 2 is a flowchart illustrating the processes conducted within a Noise Evaluation Module 107 according to an exemplary embodiment of the present invention. In step 202, the Noise Evaluation Module 107 receives a plurality of echo-cancelled digital signals from the Echo Cancellation Module 111 based on the digital signals received from the array of microphones 101. In step 204, the information in the signals is differentiated as belonging to either desired sound 102 or to a type of undesired noise, such as echo 103, interference 104, or noise 105. In step 206, noise evaluation module 107 estimates a level of annoyance for each type of the undesired noises to determine the relative impact on sound quality of the microphone array 101. For example, the level of annoyance may be the individual decibel levels of the different types of noise. This level of annoyance is not calculated at an instantaneous moment, but rather over a longer time period. In one embodiment, the period is in the order of seconds, and can include individually averaging the respective noise sources over a predetermined period of time. For each of the estimates, other factors, such as echo cancellation information from the Echo Cancellation Module 111, may be taken into account to estimate the level of annoyance. In step 208, the levels of annoyance are then utilized within decision logic to choose which type of undesired noise should be attenuated to best improve sound quality of the microphone array 101.

Detection of desired sound may be based on pre-defined conditions. This is especially important when there may be similar sources of desired sound and undesired noise. For example, where one speaker's voice is desired sound and a competing speaker's voice represents the undesired noise. The pre-defined conditions may include an expectation that any sound from a certain angle relative to the microphone array, in front of the array, or any other particular formulation is a desired sound. In such a case when a voice of a speaker in front of a device is considered desired sound, another speaker's voice from the side of the device would be treated as interference, and thus undesired noise. Alternatively, desired sound can be designated using speaker identification, and a particular individual's voice can be tracked even if the person is moving in the local environment, or the device is a handheld and is moving relative to the interference.

The application of the decision logic may be a function of numerous variables. For example, if one source dominates another source by a certain amount of decibels (i.e. signal strength) for a certain period of a time, then that particular source would be chosen as the target noise source to be attenuated. For example, if echo 103 dominates noise 105 and/or interference 104 by 3 db for two seconds, or echo 103 dominates noise 105 and/or interference 104 by 2 db for three seconds, then echo is selected to be the noise target that is to be attenuated by the beamformers in the Noise Reduction Module 108. In other embodiments, the desired sound can serve as a common reference or each type of the captured undesired noise can be compared with each other, or a predefined reference point. Furthermore, numerous linear and non-linear variations of the decision logic can be implemented.

The advantage of estimating levels of annoyance based on a longer time period rather than an instantaneous moment is that the noise source targeted for attenuation will not continuously vary based on instantaneous (noise-like) changes in the environment. Therefore, if a silent noise source suddenly becomes momentarily active, it would be undesirable for the device to start targeting that source when it is only active for an instantaneous moment. For example, if the echo 103 is constantly dominant and a competing source speaks (interference 104) or makes a noise 105, a user would not want to adapt the beamforming towards that competing source as the person may be quiet after saying one word at a high decibel level. If the beamforming were to be adapted towards that source, the echo 103 will not be addressed and therefore affect the overall voice quality that is produced by the microphone. As a further example, a door slam should not steer away the beamforming from the primary source of undesired noise. Accordingly, the long-term estimate of the level of the annoyance of all three undesired sources in the present invention allows for more sophisticated use of attenuation for higher voice quality. Essentially, it is desired to take into account a threshold loudness for a threshold period of time during the steps 206 and 208.

Figure 3:
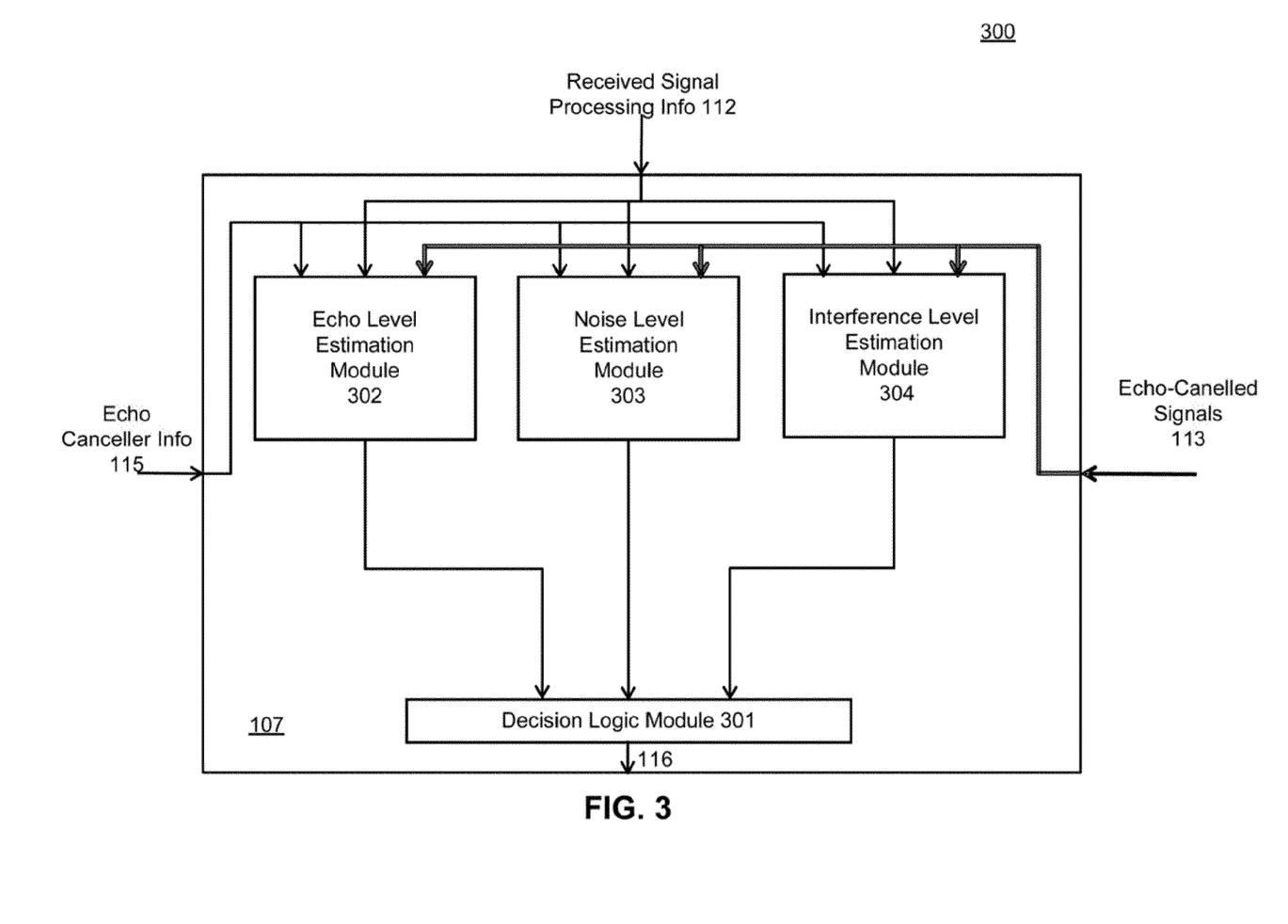
FIG. 3 illustrates a block diagram that includes certain aspects of a Noise Evaluation Module according to an exemplary embodiment of the present invention.

FIG. 3 illustrates a Block Diagram 300 which further defines Noise Evaluation Module 107 in accordance with an exemplary embodiment of the present invention. FIG. 3 is illustrative of undesired noise level estimation and application of decision logic by the Decision Logic Module 301 and the factors that may impact estimations of levels of annoyance. FIG. 3 purposefully does not illustrate the use and application of desired sound in order to better focus on comprehension of the levels of annoyance estimation process that is associated with each type of undesired noise.

Still referring to FIG. 3, Echo canceller information 115 is provided from the Echo Cancellation Module 111, received signal processing info 112 is provided from the Received Signal Processing Module 109 and echo-cancelled signals 113 are provided from the Echo Cancellation Module 111. The Echo Level Estimation Module 302 estimates the level of annoyance of the echo 103. For this estimation, the Echo Level Estimation Module 302 takes into account the echo-cancelled signals 113, but it may also use echo canceller information 115 to estimate the overall effect of the echo 103. In an embodiment, quantities utilized to measure the level of annoyance for the echo 103 may include quantities such as Echo Return Loss or Echo Return Loss Enhancement. As discussed previously, an estimation of the level of annoyance is not based just on a particular instantaneous moment but over a long-term period in the order of seconds, and may include averaging one or more parameters related to particular noise over the designated time period. Additionally, the received signal processing info 112 or other information can be taken into account for a more accurate estimation of the level of annoyance. Similar to the Echo Level Estimation Module 302, the Noise Level Estimation Module 303 and the Interference Level Estimation Module 304 observe the digital signals and estimate the levels of annoyance for their respective noise sources on a relatively long-term basis, as opposed to an instantaneous decision. Furthermore, similarly to the Echo Level Estimation Module 302, other relevant information can be provided to the Noise Level Estimation Module 303 and the Interference Level Estimation Module 304 for a more accurate estimation of the levels of annoyance.

In an another embodiment of the Noise Evaluation Module 107, both echo 103 and noise 105 may first be evaluated to detect if they should be attenuated. If both echo 103 and noise 105 are present, then an evaluation is done with regards to which of the two sources is dominant. If only one of echo 103 and noise 105 is present, then that type of undesired noise would be attenuated. Furthermore, if neither of the types of undesired sources are present, then any other sources of noise are evaluated to see if they are desired sound 102 (e.g., desired source speaking) or interference 104 (e.g. competing speech). In this case, if both a desired sound 102 and interference 104 are detected, then interference 104 would be attenuated. However, it is imperative when evaluating the level of annoyance that the evaluation is done on a long-term basis. In an exemplary embodiment, a long-term timeframe would be in the order of seconds and not instantaneous, and may include averaging over the selected time period.

Figure 4:
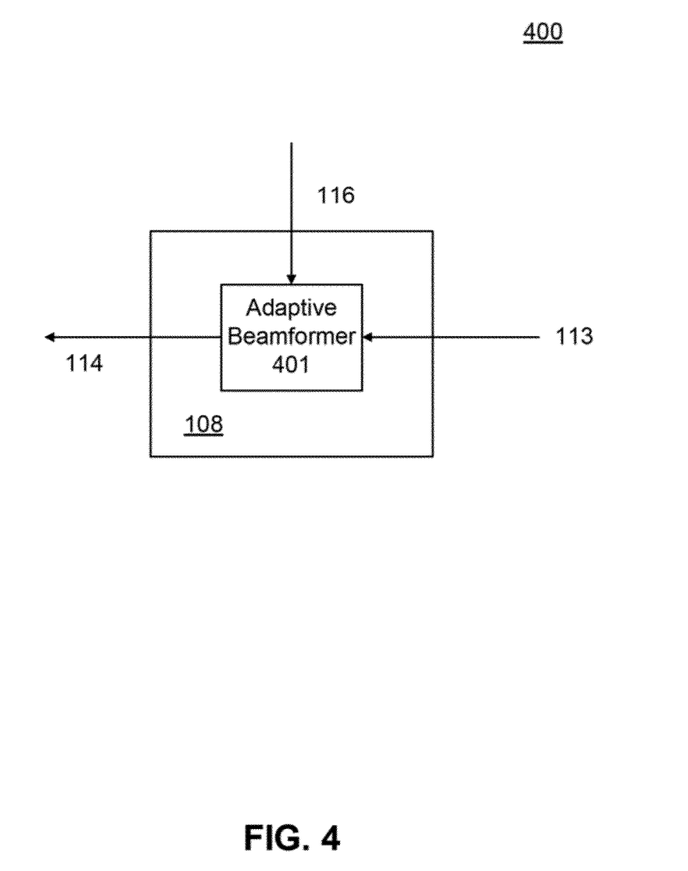
FIG. 4 illustrates a block diagram that includes a Beamfomer Application Module according to an exemplary embodiment of the present invention.

FIG. 4 illustrates a Block Diagram 400 which further defines Beamformer Application Module 108 according to an exemplary embodiment of the present invention. In this embodiment, an adaptive beamformer 401 is utilized. When the Noise Evaluation Module 107 chooses an undesired noise source to attenuate, the adaptive beamformer 401 implements the beamforming to attenuate the targeted noise by effectively attenuating data in the reception pattern of the microphone array in the direction of the targeted noise source, using known beamforming techniques. More specifically, the echo-cancelled signals 113 are processed so that data representative of sound from the direction of targeted noise is attenuated relative to sound from other directions. For example, if the Noise Evaluation Module 107 identifies noise 105 as the target, then the adaptive beamformer 401 tracks the noise 105 and attenuates the data representative of sound received in the direction of the targeted noise, which can include but is not limited to null steering in the direction of the targeted noise. The speed of the adaptation occurs at its most responsive rate to maximize tracking ability of a moving noise source, as opposed to a reduced rate that would occur if an intentional delay was introduced.

The advantage of the present invention is that the impact of the noise sources on acoustic quality are examined over a relative long period of time (e.g. seconds) prior to picking the noise target to attenuate. This precludes continuously "chasing" a noise source(s) that is high strength but short in duration (e.g. a door slam, or intermittent speaker). However, once the noise target is determined then the adaptation occurs at the maximum responsiveness (e.g. instantaneous), without any intentional delay introduced. This will maximize noise tracking ability of a moving noise source.

Figure 5:
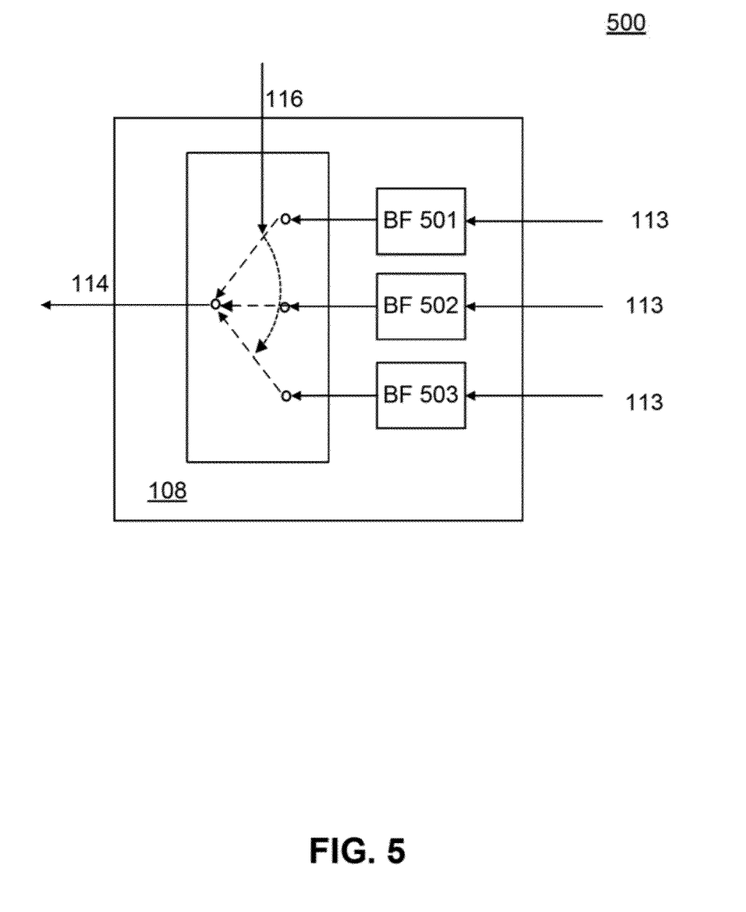
FIG. 5 illustrates a block diagram that includes another Beamfomer Application Module according to an exemplary embodiment of the present invention.

FIG. 5 further illustrates Block Diagram 500 that further defines a Beamformer Application Module 108 according to another exemplary embodiment of the present invention. In this embodiment, fixed beamformers are utilized. Each beamformer is configured to attenuate a particular characteristic. For example, beamformer 501 may be configured to attenuate echo 103, beamformer 502 may be configured to attenuate noise 105, and beamformer 503 may be configured to attenuate interference 104. If the Noise Evaluation Module 107 determines that noise 105 is dominant and should be attenuated, then beamformer 502 would be selected to directionally attenuate noise 105. For example in a fixed beamforming environment, one beamformer would be chosen to attenuate the echo 103, while another one would be chosen to attenuate interference 104 from the sides of the microphone. The present embodiment may be modified to further contain a plurality of additional fixed beamformers, as will be understood by those skilled in the arts.

Figure 6:
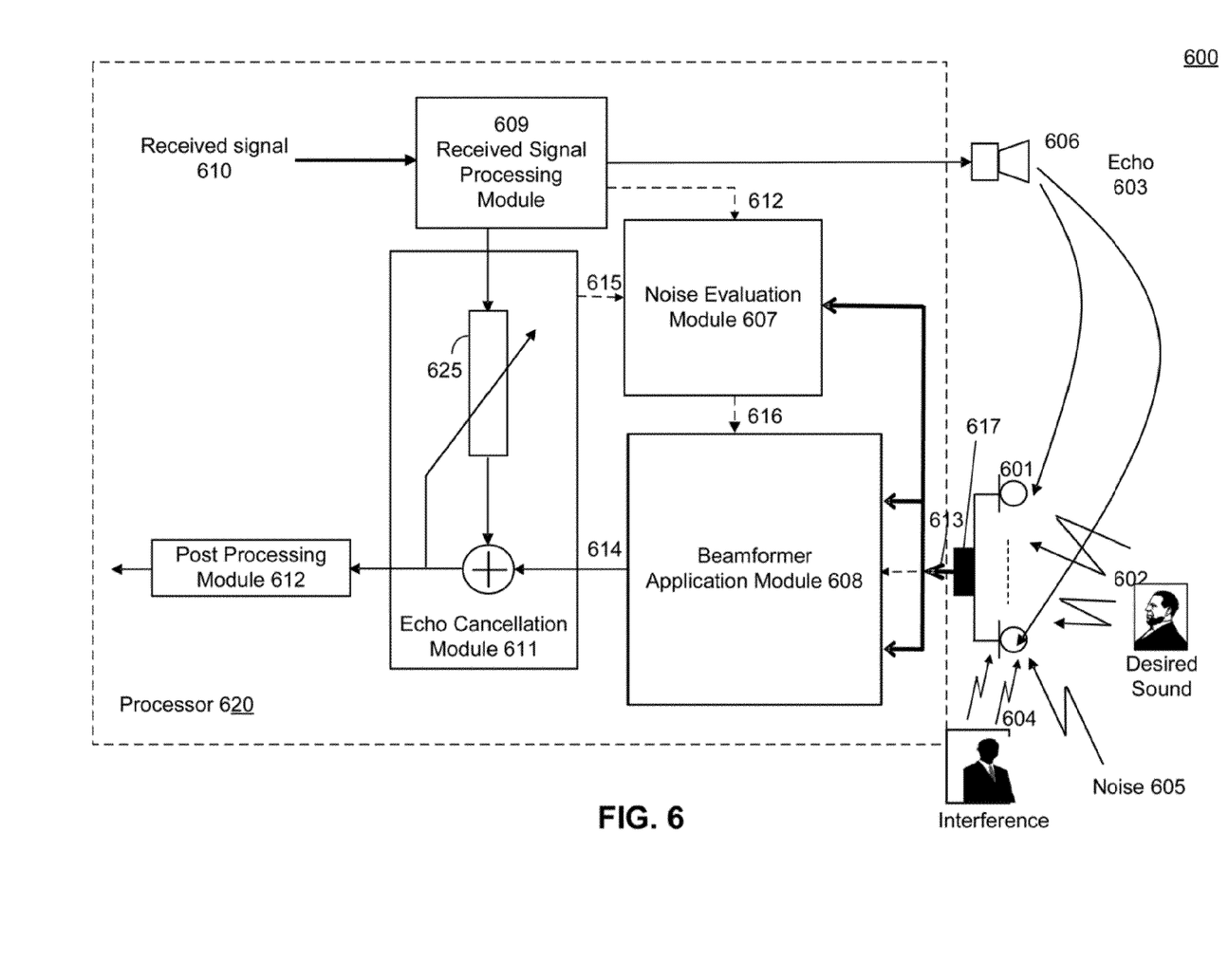
FIG. 6 illustrates block diagram of a noise reduction device according to another embodiment of the present invention.

FIG. 6 illustrates a block diagram of a Noise Reduction Device 600 according to another embodiment of the present invention. A microphone array 601 captures analog signals from a source of desired sound 102 and a plurality of sources of undesired noise including echo 603, interference 604, and noise 605. The microphones in the microphone array 601 may be a plurality of omnidirectional microphones. The device 600 may operate in a similar environment as device 100. The echo 603 is the feedback from a speaker 606 that is associated with the microphone array 601. Codecs 617 coupled to the output of microphone array 601, convert the received analog signals into digital signals 613. The digital signals 613 having the desired sound and undesired noise are provided to a Noise Evaluation Module 607 and to a Beamformer Application Module 608 within a processor 620 or a similar environment. Processor 620 may be a digital signal processor ("DSP"), for example, operating various hardware and or software signal processing modules as described herein.

The Noise Evaluation Module 607 picks which undesired noise source to attenuate, and generates attenuation information 616 to identify the target noise source. This attenuation information 616 is then provided to the Beamformer Application Module 608 to implement the attenuation decision made in the Noise Evaluation Module 607. More specifically, the Beamformer Application Module 608 attenuates the data representative of the targeted noise identified by attenuation information 616, to generate attenuated signals 614. The Noise Reduction Device 600 further contains a Received Signal Processing Module 609 to process a received signal 610 that is meant for broadcast by speaker 606, which inadvertently generates the echo 603. Accordingly, the received signal 610 may be a digital signal representing the voice of another speaker on a phone call that is to be broadcast by speaker 606 of the device 600.

Still referring to FIG. 6, an Echo-Cancellation Module 611 and Post Processing Module 612 are included as well. After attenuation occurs in the Beamformer Application Module 608, the attenuated signals 614 are passed to the Echo Cancellation Module 611, to cancel echo 603 caused by the received signal 610, since received signal 610 is known. More specifically, received signal processing module 609 generates a digital version of received signal 610 that is sent to echo cancellation module 611, where it is filtered by filter 625 to account for room acoustics. Echo Cancellation Module 611 then cancels the filtered version of the received signal 610 from the outputted attenuation signals 614 from the Beamformer Application Module 608. After echo cancellation, the combined signals are forwarded to the Post Processing Module 612 for any post processing that may be done, as will be understood by one of ordinary skill in the art.

Still referring to FIG. 6, the Noise Evaluation Module 607 and Beamformer Application Module 608 may function similarly to the respective Noise Evaluation Module 107 and Beamformer Application Module 108 of the exemplary embodiment presented in FIG. 1. Digital signals 613, received signal processing info 612, echo canceller info 615, attenuation information 616 and attenuated signals 614 provide similar functionality within the respective modules as echo-cancelled signals 113, received signal processing info 112, echo canceller info 115, attenuation information 116 and attenuated signals 114 respectively.

By comparison to system 100, instead of echo-cancelled signals 113 being provided to the Noise Evaluation Module 107 and Beamformer Application Module 108, in the system 600, digital signals 613 are provided directly from the output of the codecs 617 coupled to the array of the microphones 601. Therefore, system 600 performs the beamforming prior to echo cancellation, whereas system 100 performs these functions in the reverse order.

However, the determination of levels of annoyance within a respective Noise Evaluation Module 607 and the application of the beamformers in the Beamformer Application Module 608 are conducted in analogous manners.

Other Modifications

In another exemplary embodiment, for choosing the type of undesired noise to attenuate after the application of decision logic in the Noise Evaluation Module 107, a soft decision is made with respect to the decision logic. In this exemplary embodiment, instead of extending full attenuation towards only one source of a type of undesired noise by the beamformer, a weighted summation is calculated, and this calculation is utilized to attenuate a plurality of sources of undesired noise.

In another exemplary embodiment, a feedback loop can be provided from the Beamformer Application Module 108 to the Noise Evaluation Module 107. This could be utilized both for a hard decision extending attenuation towards only one source of undesired noise or a soft decision extending attenuation towards a plurality of sources of undesired noise. This feedback loop would allow the Decision Logic Module 301 to take into account the effect of the beamformers. Accordingly, for the selection in Step 208 of FIG. 2, the Noise Evaluation Module 107 would not be limited to considering only the digital signals 113 for the microphone levels, but also the impact on the digital signals 113 of attenuation post the respective beamformers. For example, one of these beamformers which may attenuate one characteristic may amplify another characteristic, having an overall negative impact on voice quality. Thus, it would be helpful to use these signals in annoyance level checks not only for the microphone signals but also the post-beamforming signals to make a decision based on overall impact for the improvement of voice quality.

In another exemplary embodiment, an evaluation may be done regarding the expected performance of the beamformers in a respective Beamformer Application Module with respect to attenuation of any undesired noise. This expected performance information may be considered by the Noise Evaluation Module when making the selection as to which one of the plurality of types of noise to attenuate. In other words, the purpose is to avoid selecting noise sources for attenuation that have a low probability for success. Therefore, an estimation can be made as to likely success in attenuating a particular noise source(s), and the estimate can used during the decision of which noise source to target.

The representative signal processing functions described herein (e.g. noise evaluation, fixed and adaptive beamforming, echo cancellation, etc.) can be implemented in hardware, software, or some combination thereof. For instance, the signal processing functions can be implemented using computer processors, computer logic, application specific circuits (ASIC), digital logic, digital signal processors, etc., as will be understood by those skilled in the arts based on the discussion given herein. Accordingly, any processor that performs the signal processing functions, or logic selection, described herein is within the scope and spirit of the present invention.

Further, the signal processing functions described herein could be embodied by computer program instructions that are executed by a computer processor or any one of the hardware devices listed above. The computer program instructions cause the processor to perform the signal processing functions described herein. The computer program instructions (e.g. software) can be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

CONCLUSION

It is to be appreciated that the Detailed Description section, and not the Abstract section, is intended to be used to interpret the claims. The Abstract section may set forth one or more but not all exemplary embodiments of the present invention as contemplated by the inventors, and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A noise-reduction device, comprising:
a microphone array;
a codec configured to convert analog signals from the microphone array into digital signals; and
a processor configured to:
apply echo cancellation to the received digital signals to produce echo-cancelled signals;
detect a desired sound and a plurality of types of noise in the echo-cancelled signals;
determine a level of annoyance over a threshold period of time for each of the plurality of types of noise;
select one of the plurality of types of noise to attenuate based on the determined levels of annoyance; and
apply a beamforming technique to the digital signals to attenuate the selected noise type.

2. The noise-reduction device of claim 1, wherein the threshold period of time is in the order of seconds.

3. The noise-reduction device of claim 1, wherein the plurality of types of noise comprise two or more of echo, interference, and local noise.

4. The noise-reduction device of claim 3, wherein the desired sound is pre-defined based on one of a spatial relationship relative to the microphone array, or speaker identification.

5. The noise-reduction device of claim 1, wherein the processor is further configured to apply the beamforming technique utilizing a plurality of fixed beamformers, and wherein each of the plurality of fixed beamformers is configured to attenuate a particular acoustic characteristic.

6. The noise-reduction device of claim 1, wherein the processor is further configured to apply the beamforming technique utilizing an adaptive beamformer to adapt to the selected type of noise.

7. The noise-reduction device of claim 1, wherein the processor is further configured to select one of the plurality of types of noise to attenuate using decision logic, the decision logic being based on a linear function between the level of annoyance for each of the plurality of types of noise and the threshold period of time.

8. The noise-reduction device of claim 1, wherein echo-cancellation information is used in determination of the level of annoyance for each of the plurality of types of noise.

9. The noise-reduction device of claim 8, wherein noise-repression information is further used in determination of the level of annoyance for each of the plurality of types of noise.

10. A noise-reduction device, comprising:
a microphone array;
a codec configured to convert analog signals from the microphone array to digital signals; and
a processor, configured to:
receive the digital signals from the codec;
apply echo cancellation to the received digital signals to produce echo-cancelled signals;
detect, in the echo-cancelled signals, a plurality of sources comprising desired sound, echo, interference and noise;
determine a level of annoyance of echo, interference and noise over a threshold period of time;
select one of echo, interference and noise to attenuate based on the determined levels of annoyance; and
apply a beamforming technique based on the selection.

11. A method for improving audio quality in a communication device, comprising:
receiving digital signals based on analog signals captured by a microphone array;
applying echo cancellation to the received digital signals to produce echo-cancelled signals;
detecting a desired sound and a plurality of types of noise in the echo-cancelled signals;
determining a level of annoyance over a threshold period of time for each of the plurality of types of noise;
selecting one of the plurality of types of noise to attenuate based on the determined levels of annoyance; and
applying a beamforming technique to the digital signals to attenuate the selected noise type from the plurality of types of noise.

12. The method of claim 11, wherein the threshold period of time is in the order of seconds.

13. The method of claim 11, wherein the plurality of types of noise comprise two or more of echo, interference and noise.

14. The method of claim 13, wherein the desired sound is pre-defined based on one of: a spatial relationship relative to the microphone array, or speaker identification on spatial properties or speaker identification.

15. The method of claim 11, wherein applying the beamforming technique includes the use of a plurality of fixed beamformers, and wherein each of the plurality of fixed beamformers attenuates a particular acoustic characteristic.

16. The method of claim 11, wherein applying the beamforming technique includes the use of an adaptive beam former to adapt to the selected one of the plurality of types of noise.

17. The method of claim 11, further comprising:
selecting one of the plurality of types of noise to attenuate based on the application of decision logic, wherein the decision logic is based on a linear function between the level of annoyance for each of the plurality of types of undesired noise and the threshold period of time.

18. The method of claim 11, wherein echo-cancellation information is used in determining the level of annoyance for each of the plurality of types of noise.

19. The method of claim 18, wherein noise-repression information is further used in determining the level of annoyance for each of the plurality of types of undesired noise.

20. The noise-reduction device of claim 1, wherein the processor is configured to:
select the one of the plurality of types of noise to attenuate based on a comparison of a signal strength of the one of the plurality of types of noise with a signal strength of another one of the plurality of types of noise over the threshold period of time.

21. The noise-reduction device of claim 1, wherein the processor is configured to:
determine the level of annoyance for each of the plurality of types of noise based on corresponding signal strengths of the plurality of types of noise over the threshold period of time.

22. The noise-reduction device of claim 10, wherein the processor is configured to:
determine the level of annoyance for echo, interference, and noise based on corresponding signal strengths of the echo, the interference, and the noise over the threshold period of time.

23. The method of claim 11, wherein the determining the level of annoyance comprises:
determining the level of annoyance for each of the plurality of types of noise based on corresponding signal strengths of the plurality of types of noise over the threshold period of time.

* * * * *